v

US008050974B2

(12) United States Patent
Lopez et al.

(10) Patent No.: US 8,050,974 B2
(45) Date of Patent: Nov. 1, 2011

(54) METHOD AND SYSTEM FOR PRICE SUGGESTING USING ITEM-SPECIFIC ATTRIBUTES

(75) Inventors: Gus Lopez, Seattle, WA (US); Joel R. Spiegel, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 371 days.

(21) Appl. No.: 10/664,820

(22) Filed: Sep. 17, 2003

(65) Prior Publication Data

US 2005/0102189 A1    May 12, 2005

Related U.S. Application Data

(63) Continuation of application No. 09/344,787, filed on Jun. 25, 1999, now abandoned.

(51) Int. Cl.
*G06Q 30/00* (2006.01)
(52) U.S. Cl. ...................................................... 705/26.1
(58) Field of Classification Search .................... 705/26, 705/27, 37, 26.1
See application file for complete search history.

(56) References Cited

U.S. PATENT DOCUMENTS

| | | | |
|---|---|---|---|
| 4,191,472 A | 3/1980 | Mason | |
| 4,992,940 A | 2/1991 | Dworkin | |
| 5,748,188 A | 5/1998 | Hu et al. | |
| 5,911,131 A | 6/1999 | Vig | |
| 6,044,363 A * | 3/2000 | Mori et al. | 705/37 |
| 6,304,853 B1 | 10/2001 | Malnekoff | |
| 6,393,426 B1 * | 5/2002 | Odom et al. | 707/100 |
| 6,411,960 B1 * | 6/2002 | Fisher | 707/102 |
| 6,415,264 B1 * | 7/2002 | Walker et al. | 705/26 |
| 6,463,431 B1 * | 10/2002 | Schmitt | 707/5 |
| 6,799,165 B1 * | 9/2004 | Boesjes | 705/28 |
| 2005/0125348 A1 * | 6/2005 | Fulton et al. | 705/40 |

OTHER PUBLICATIONS

Product Differentiability in the Residential Message Telecommunications Services (MTS) and MTS-Like Markets: An Empirical Study; by Mohajer-Jasbi, Majid http://proquest.umi.com/pqdweb?did=752307821&sid=10&Fmt=2&clientId=19649 &RQT=309&VName=PQD.*
"Kelley Blue Books Offers Extensive Information on Yello-Page. Net," Business Wire, May 28, 1999 (1 page) http://www.dialogclassic.com/main.vmgw [Accessed Oct. 25, 2002].

(Continued)

*Primary Examiner* — Mila Airapetian
(74) *Attorney, Agent, or Firm* — Thomas, Kayden, Horstemeyer & Risley, LlP

(57) ABSTRACT

A method and system for generating transaction price data relating to electronic commerce. In one embodiment, the system classifies items based on an item classification hierarchy. Each item classification in the hierarchy may have associated item-specific attributes. When a commercial transaction relating to an item is conducted, the item is identified based on its item classification and values for the associated item-specific attributes. The system records information relating to commercial transactions for items that have been so identified and uses those records to generate transaction price data. For example, the system may evaluate commercial transactions relating to a fixed-price sales or auctions to a suggest the fair market value of the item. When generating transaction price data, the system may allow the user to specify an item classification along with values of its attributes. The system identifies records of commercial transactions relating to items with that item classification and with matching attribute values and bases the transaction price data on those identified records.

25 Claims, 13 Drawing Sheets

OTHER PUBLICATIONS

"GO Network Gears Up with New Automotive Center: Featuring Tools from Leading Automotive Information Providers," Business Wire, May 26, 1999 (2 pages) http://www.dialogclassic.com/main.vmgw [Accessed Oct. 25, 2002].

"Auto-By-Tel Partners with Infoseek as Exclusive Car Buying Program on its Automotive Channel," PR Newswire, Oct. 21, 1997 (3 pages) http://www.dialogclassic.com/main.vmgw [Accessed Oct. 25, 2002].

"Pricing for 600 Models of '98 Cars Now Available on Kelley Blue Book Web Site," PR Newswire, Sep. 22, 1997 (2 pages) http://www.dialogclassic.com/main.vmgw [Accessed Oct. 25, 2002].

"Driving the Dream?," Essence Magazine, Nov. 1999 (5 pages) http://www.dialogclassic.com/main.vmgw [Accessed Oct. 25, 2002].

"AutoConnect Partners with Industry Leaders to Bring Most-Comprehensive Auto Shopping Site to Web," Business Wire, May 19, 1998 (3 pages).

"Microsoft CarPoint Opens Up Used-Car Market with Version 2.0 of Web Site," PR Newswire, Oct. 23, 1997 (2 pages) http://www.dialogclassic.com/main.vmgw [Accessed Oct. 25, 2002].

Excite Auctions http://www.classifieds2000.com/cgi-cls/d...PC Desktop-Search & AuctionButtonChecked=1& [Accessed May 16, 1999].

Excite Auctions http://www.classifieds2000.com/cgi-cls/d...tner=xc-xac&path=Computer-Router-search& [Accessed May 16, 1999].

Excite Auctions http://www.classifieds2000.com/cgi-cls/D...xc-xac+Computer+PCDesktop+PlaceAdAuction [Accessed Jun. 24, 1999].

Excite Auctions http://www.classifieds2000.com/cgi-cls/V...xe?xc-sac+Generic+jewelry+PlaceAdAuction [Accessed Jun. 24, 1999].

Snyder, Alan, "Encapsulation and Inheritance in Object-Oriented Programming Languages," Software Technology Laboratory, Hewlett-Packard Laboratories, Palo Alto, California, 1986.

"Bidder's Edge Offers Online Shoppers the Best of eBay and Auction Universe; Auction Enthusiasts Can Now Find the Best Deals on Beanie Babies and Furbies Over the Internet," Business Wire, Dec. 21, 1998.

"Buy, Bid or Bargain? Excite Offers Integrated Internet Shopping Search to Give Users Powerful Web Shopping Opportunities," PR Newswire, Jul. 21, 1998.

"MySimon Launches Next-Generation Web-Shopping Engine Offering Instant E-Commerce Shopping Channel for Portals," PR Newswire, Oct. 26, 1998.

* cited by examiner

Item/Attribute Mapping

Item/Attribute Table 305

| Item | AH1 | AH2 | AHN |
|---|---|---|---|
| Barbie | 2 | | |
| Toys | 0 | 1 | |
| 123 | 4 | | |
| 125 | | | |

Attribute Table 310

| | Name | Type | Values |
|---|---|---|---|
| 0 | Condition | list | 0 |
| 1 | Price | dollar | |
| 2 | Year | number | |
| 3 | Color | list | 1 |
| 4 | Size | number | |

Value Table 315

| 0 | 1 - new<br>2 - excellent<br>3 - good<br>4 - ... |
|---|---|
| 1 | 1 - red<br>2 - green<br>... |

*Fig. 3*

Item Hierarchy
  Toys
    Dolls
      Barbie

Transaction Table

| Model | Condition | Color | Sale Type | Sale Price | Sale Date | Duration | ... |
|-------|-----------|-------|-----------|------------|-----------|----------|-----|
| 123 | 1 | red | auction | 100 | 1/28/99 | 3 | |
| 123 | 5 | red | sale | 50 | 2/1/99 | 5 | |
| 125 | 2 | green | wanted | 75 | 2/2/99 | 10 | |
| 125 | 8 | green | auction | 25 | 2/4/99 | 2 | |
| . | | | | | | | |
| . | | | | | | | |

AHN 800

*Fig. 8*

Transaction Price Suggestion

Browse Hierarchy
  Toys
    Dolls
      Barbie

901

| Model | Condition | Color | Sale Type | Sale Price | Sale Date | Duration | ... |
|-------|-----------|-------|-----------|------------|-----------|----------|-----|
| 123   | good      | red   | auction   |            |           | <3       |     |

Suggest Price — 902

*Fig. 9*

Transaction Price Suggestion

Browse Hierarchy
    Toys
        Dolls
           Barbie

*1000*

| Model | Condition | Color | Sale Type | Sale Price | Sale Date | Duration | ... |
|---|---|---|---|---|---|---|---|
| 123 | 3 | red | auction | | | <3 | |

*1001*

Based on review of 15 transaction for matching items, we suggest a sale price of $75-$100 to sell the item with the specified duration.

*1002*

| Statistic | Price |
|---|---|
| Minimum | $50 |
| Average | $85 |
| Median | $75 |
| Maximum | $150 |

*1003*

( Review Transactions )  ( List Item for Sale )  ( List Item in Auction )  ( Place a bid )

Transaction Trend Analysis

Browse Hierarchy
　Toys
　／　Dolls
1100　Barbie

| Model | Condition | Color | Sale Type | Sale Price | Sale Date | Duration | ... |
|---|---|---|---|---|---|---|---|
|  | X |  | auction | Y | >1/1/99 | <3 |  |

／1101

METHOD AND SYSTEM FOR PRICE SUGGESTING USING ITEM-SPECIFIC ATTRIBUTES

CROSS-REFERENCE TO RELATED APPLICATION

This application is a continuation of U.S. patent application Ser. No. 09/344,787 filed on Jun. 25, 1999 now abandoned, which is hereby incorporated by reference in its entirety.

TECHNICAL FIELD

The described technology relates generally to conducting electronic commerce and, more particularly, to identifying transaction price data for commercial transactions conducted over a computer network.

BACKGROUND

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product and services. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system and schedules shipment of the items.

The World Wide Web is also being used to conduct other types of commercial transactions. For example, server computer systems have been developed to support the conducting of auctions electronically, to support a buying service where a user lists an item that the user wants to purchase and specifies the purchase price, and to support fixed-price sale transactions where users advertise their items to be sold. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction. To purchase an item using a buying service, the user identifies the item (e.g., an airline ticket) and a price that they are willing to pay for the item via a web page to a server computer system. The server computer system contacts potential sellers to see if they are willing to sell the item for that price. If a seller is found, the server computer system notifies the buyer and may automatically charge an account of the buyer.

Because of the vast number of commercial transactions being conducted and because of the speed at which they are being conducted, it can be very difficult to assess what is the fair market value of an item that is the subject of an electronic transaction. Because not much information on previous transactions is readily available, sellers listing items at a fixed-price sale or at an auction may have difficulty setting the fixed prices, the minimum bid, or a reserve price. Similarly, potential buyers either at a fixed-price sale or at an auction may not have a good sense for the fair market value for items. It has been traditionally very difficult to disseminate readily useful information about such electronic commercial transactions.

In particular, it has been very difficult to categorize commercial transactions with sufficient specificity to support pricing analysis. Some server computer systems may use a keyword approach to help identify related commercial transactions. The use of keywords has several problems that arise, in part, from the flexibility that users have in specifying keywords. Problems that limit the usefulness of analysis based on keywords include lack of a common set of keyword, extensive use of synonyms, and use of words that have multiple unrelated meanings (i.e., court for sport and court for law). It would be desirable to have a technique for categorizing commercial transactions is such a way that useful transaction price data can be derived.

SUMMARY

A method and system for generating transaction price data relating to electronic commerce are provided. In one embodiment, the system classifies items based on an item classification hierarchy. Each item classification in the hierarchy may have associated item-specific attributes. When a commercial transaction relating to an item is conducted, the item is identified based on its item classification and values for the associated item-specific attributes. The system records information relating to commercial transactions for items that have been so identified and uses those records to generate transaction price data. For example, the system may evaluate commercial transactions relating to a fixed-price sales or auctions to a suggest the fair market value of the item. When generating transaction price data, the system may allow the user to specify an item classification along with values for its attributes. The system identifies records of commercial transactions relating to items with that item classification and with matching attribute values and bases the transaction price data on those identified records. The system may perform various statistical analyses on the identified records. For example, the system may identify a fair market value for the item assuming that the item is to sell within a certain number of days. The system may also display a graph based on the identified commercial transactions. For example, the system may allow the user to specify which attributes to use as a x coordinate and as a y coordinate and then may generate a graph based on those attributes.

BRIEF DESCRIPTION OF THE DRAWINGS

FIG. 3 is a block diagram illustrating the item/attribute mapping data structure.

FIG. 8 illustrates a transaction table of the transaction database.

FIG. 9 illustrates an example display for generating a transaction price suggestion.

FIG. 10 illustrates an example display of a suggested price information.

DETAILED DESCRIPTION

A method and system for generating transaction price data using item-specific attributes are provided. In one embodiment, the price suggestion system uses an item classification hierarchy in which each item classification can have associated item-specific attributes defined. When commercial transactions (e.g., auctions and fixed-price sales) are conducted, the items that are the subjects of the commercial transactions are specified by item classification and item-specific attributes. By specifying items in such a way the records of commercial transactions for related items can be readily identified. The price suggestion system can use these records of commercial transactions to provide more meaningful transaction price data than was previously available. For example, the price suggestion system may provide a suggested bid price for the item that is being auctioned based on analysis of transactions on related items. The price suggestion system may prompt a user to select an item classification within the item classification hierarchy. After the user has selected an item classification, the price suggestion system displays an indication of the item-specific attributes associated with the item classification. The user can then specify values or ranges of values for each attribute. For example, a user may specify a value of "good" for a condition attribute. Based on the values specified, the price suggestion system analyzes transactions for items within the item classification that match the specified attribute values and provides various statistics relating to those transactions. One such statistic may be a suggested bid for an auction of the item or a suggested price for a fixed-price sale of the item.

Figure 1:
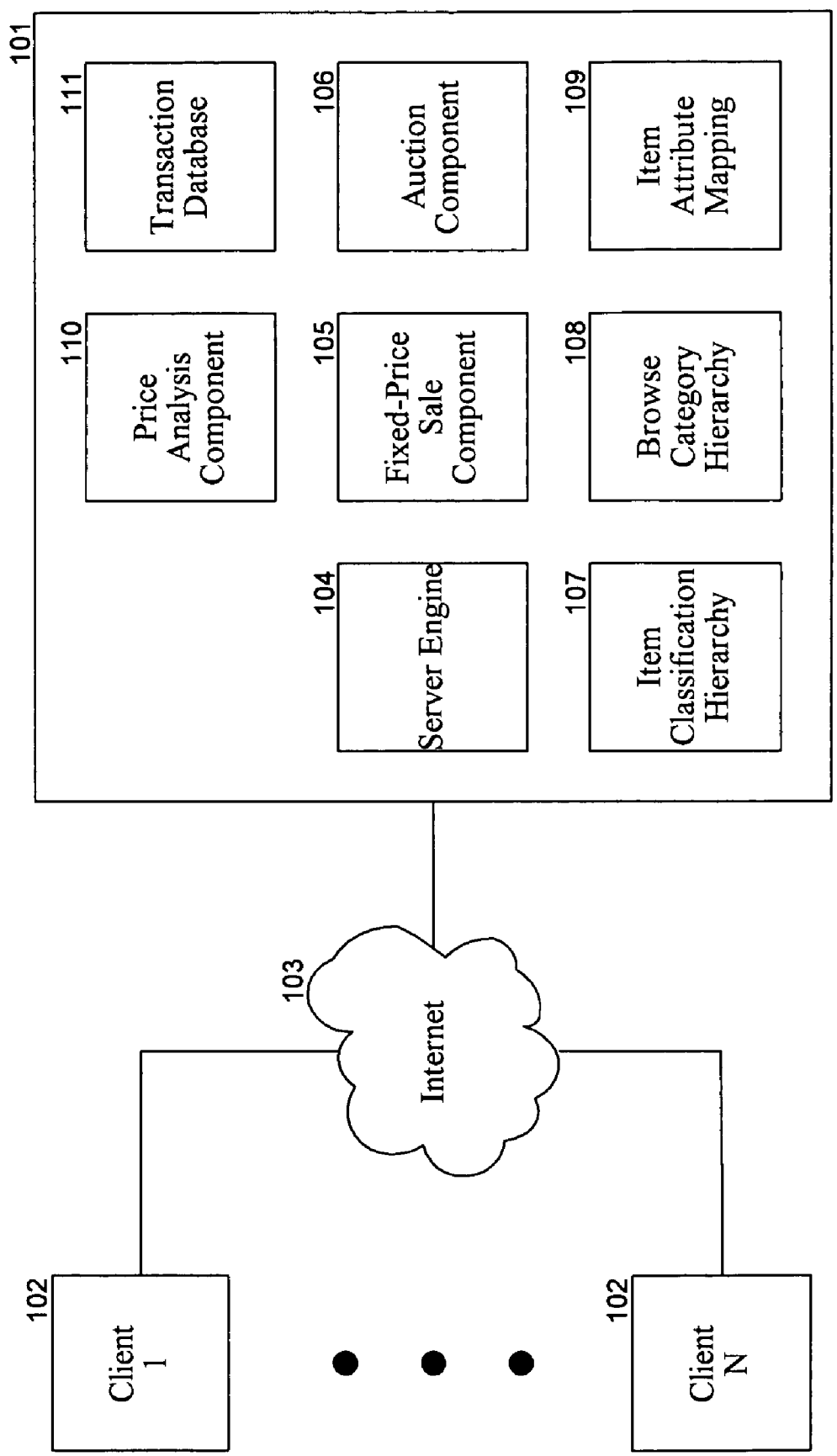
FIG. 1 is a block diagram illustrating components of the price suggestion system in one embodiment.

FIG. 1 is a block diagram illustrating components of the price suggestion system in one embodiment. The price suggestion system 101 is connected to various client computer systems 102 through a communications network 103, such as the Internet. The price suggestion system executes on a server computer system that may include a central processing unit, memory, and input/output devices. The components and data structures of the price suggestion system may be stored on computer-readable medium such as memory, a disk, or a CD-ROM and may be transmitted over a computer-readable transmission medium. The client computer systems may interact with the price suggestion system using a standard web browser. The price suggestion system includes a server engine 104, a fixed-price sale component 105, an auction component 106, an item classification hierarchy 107, a browse category hierarchy 108, an item/attribute mapping 109, a price analysis component 110, and a transaction database 111. The server engine receives HTTP-request messages from the client computer systems and responds with HTTP-response messages. The fixed-price sale component controls the conducting of the fixed-price sale of items. The fixed-price sale component allows users to list items that are for sale at a fixed price and assists the conducting of the transaction when a buyer is found. The fixed-price sales component may store a record of each concluded transaction in the transaction database. The auction component controls the conducting of auctions. The auction component allows sellers to list items and bidders to place bids on the items. When an auction closes, the auction component coordinates the concluding of the transaction. The auction component may store record of each concluded auction in the transaction database. The fixed price sale component and the auction component support the specifying of the item classification for an item and of the associated item-specific attributes. The item classification hierarchy, as described below in more detail, describes a hierarchical classifications for the items. The browse category hierarchy, as described below in more detail, describes a hierarchy a categories for assisting users in selecting items. Although the item classifications and browse categories are described as being hierarchical, the classifications can be non-hierarchical. The item/attribute mapping contains a mapping from each item classification to the item-specific attributes relating to that item. The price analysis component inputs a specification of attribute values for an item classification and generates transaction price data based on the transactions that match the specified item classification and attribute values.

Figure 2:
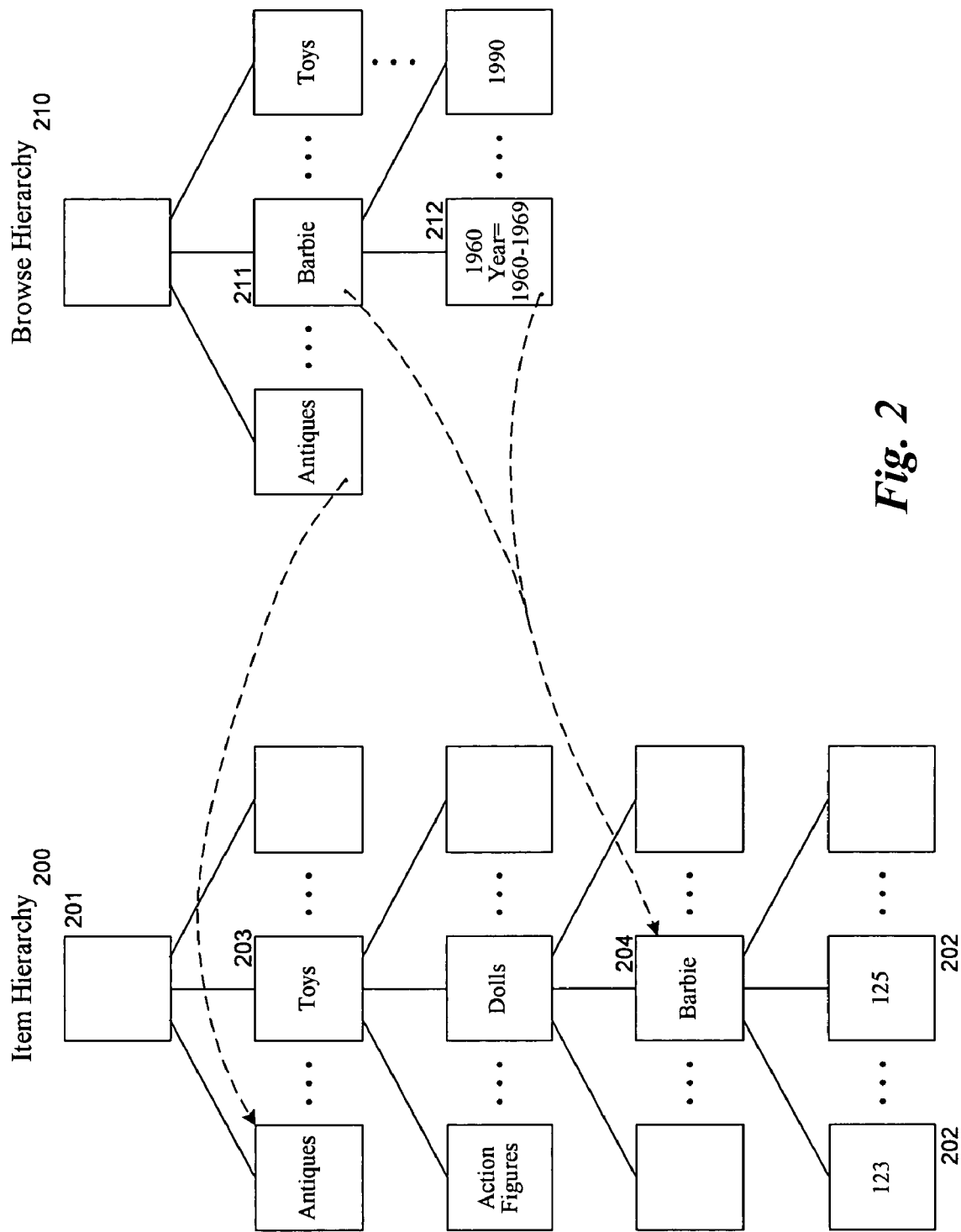
FIG. 2 is a block diagram that illustrates the item classification hierarchy and the browse category hierarchy.

FIG. 2 is a block diagram that illustrates the item classification hierarchy and the browse category hierarchy. The item classification hierarchy 200 specifies the hierarchical relationship of items. The item classification hierarchy is represented as a tree structure that includes a root classification 201, intermediate classifications 203, and leaf classifications 202. Classification 203 represents items that are classified as "toys." Within the toys classification are sub-classifications of "action figures," "dolls," and so on. Each item that is the subject of a commercial transaction is preferably classified according to the item classification hierarchy. The classification for an item does not, however, need to be a leaf classification. For example, if a doll is being auctioned, but the seller does not know the sub-classification for the doll, then the doll can be classified in the "doll" classification. In contrast, if the seller knows the specific model number of a Barbie doll, then the seller can classify the doll within a leaf classification of the item classification hierarchy. The browse category hierarchy 210 specifies the hierarchy of categories that are used to assist a user in browsing for a particular transaction or item. For example, a user who is looking for auctions related to Barbie dolls may use the browse category hierarchy to browse to the "toys" category and eventually arrive at the "Barbie" category. In one embodiment, the browse category hierarchy may represent the same hierarchical relationship as the item classification hierarchy. The browse category hierarchy, however, may be distinct. In particular, it may be advantageous to have a browse category hierarchy that places categories corresponding to item classifications much higher in the browse category hierarchy than the corresponding item classifications within the item classification hierarchy. For example, if commercial transactions relating to Barbie dolls are very popular, then the browse category hierarchy may have a "Barbie" category at the highest level in the browse category hierarchy. The corresponding "Barbie" classification in the item classification hierarchy may be many levels down in that hierarchy. In this way, users can quickly see and select categories for the more popular items, rather than having to navigate down many levels of an item classification hierarchy. Each category of the browse category hierarchy may contain information identifying a corresponding item classification in the item classification hierarchy. For example, the "Barbie" category 211 corresponds to the "Barbie" classification 204. The browse category hierarchy may also contain categories with no one-to-one correspondence with item classification. For example, Barbie dolls may be sub-categorized based on the decade in which the doll was manufactured. Barbie dolls may, however, have no corresponding sub-classification based on decade of manufacturer. Rather, the year in which a Barbie doll was manufactured may be an attribute of an item classification. In this example, the "Barbie" sub-category 212 for the decade 1960 most closely corresponds to the "Barbie" classification with its attribute value for the year attribute specified as 1960-69. One skilled in the art will appreciate that non-tree hierarchical or non-hierarchical classifications and categories may be used. For example, a Barbie doll with electronic circuitry may be in a "doll" category and in an "electronics" category. In general, the item classification organization and the browse category organization may each be represented by a general graph organization in which any classification and category may be related to any other classification or category. Also, the correspondence between browse categories and item classifications can be represented by various possible mappings between browse categories and item classifications. For example, the leaf browse categories may each correspond to a sub-graph of the item classifications that include a mapped-to item classification.

The price suggestion system may use a combination of the browse category hierarchy and the item classification hierarchy to classify items and identify attributes for the item. A user would typically browse through the browse category hierarchy until the desired category is found. If that browse category corresponds to a leaf item classification, then browsing is complete because the most specific item classification has been found. If, however, the browse category does not correspond to a leaf item classification, then the price suggestion system may allow the user to browse the sub-tree of the corresponding item classification in the item classification hierarchy. At any time, the user can stop browsing and the item will be classified within the corresponding item classification and based on the associated item-specific attributes.

FIG. 3 is a block diagram illustrating the item/attribute mapping data structure. The item/attribute mapping in one embodiment includes an item/attribute table 305, an attribute table 310, and a value table 315. The item/attribute table includes an entry for each item classification in the item classification hierarchy. Each entry also identifies the attributes that are defined for that item classification. For example, the "Barbie" classification indicates that it has only one attribute (e.g., "2," which is an index into the attribute table and which relates to the year in which the item was manufactured). The attribute table contains a list of the possible attributes of items. For example, the attribute table may contain an entry for a "condition" attribute and a "price" attribute. The value table contains information describing various lists of attribute values. For example, the attribute of "condition" may have various possible values that include new, excellent, good, and so on. The attribute table may define other item-specific, condition-type attributes, such as one with values specific to the conditions of coins (e.g., "min't" or "uncirculated").

Figure 4:
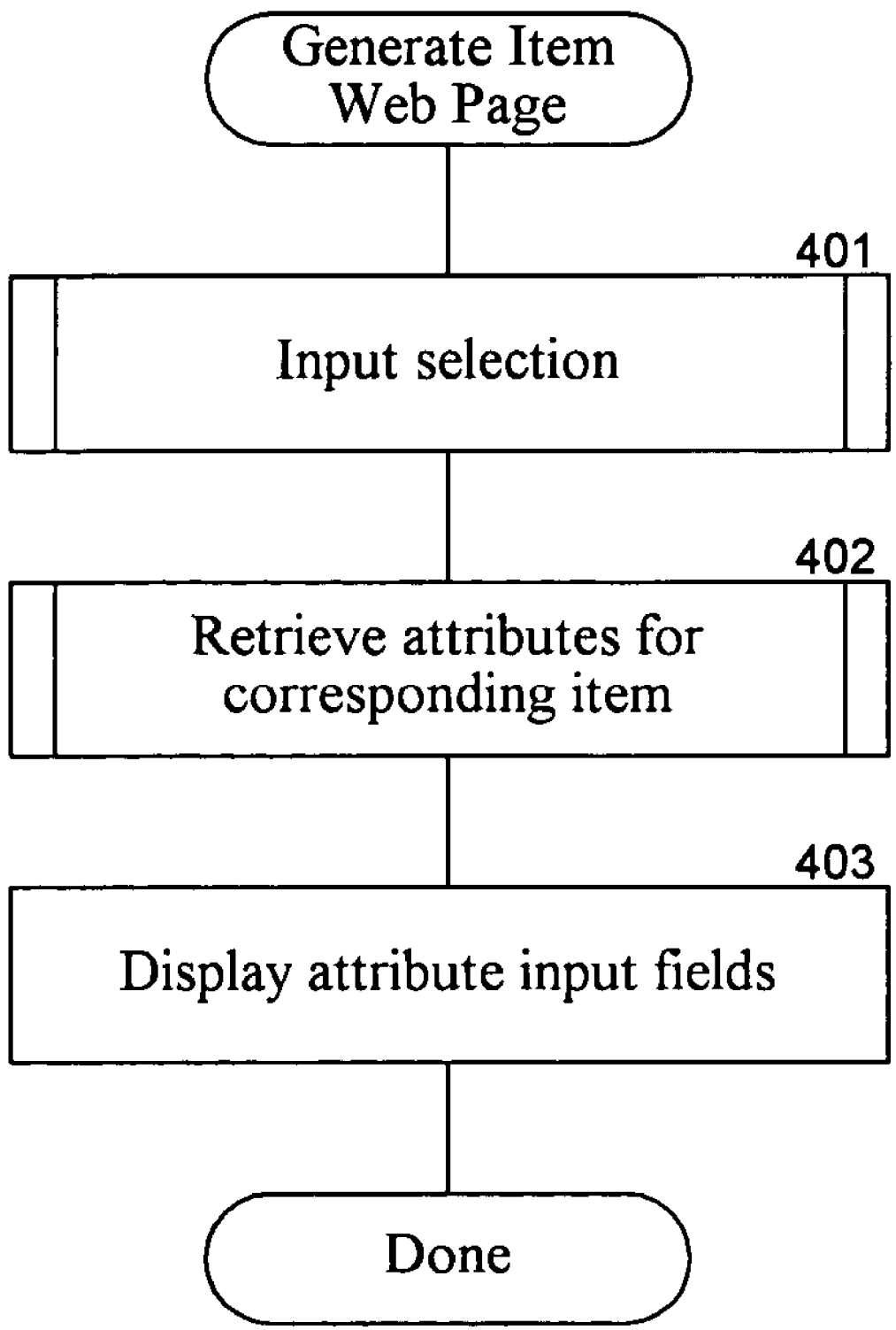
FIG. 4 is a flow diagram illustrating an example implementation of a function to generate a web page for an item that is to be the subject of a commercial transaction.

FIGS. 4-7 are flow diagrams illustrating the browsing and use of item specific attributes. FIG. 4 is a flow diagram illustrating an example implementation of a function to generate a web page for an item that is to be the subject of a commercial transaction. This function receives a selection of an item classification and then generates a web page with an indication of the item-specific attributes for that item classification. In step 401, the function receives the selection of the item classification by invoking an input selection function. In step 402, the function retrieves the item-specific attributes that correspond to the item classification by invoking a retrieve attribute function. In step 403, the function displays the retrieved item-specific attributes. The function may then prompt the user to specify values for the item-specific attributes.

Figure 5:
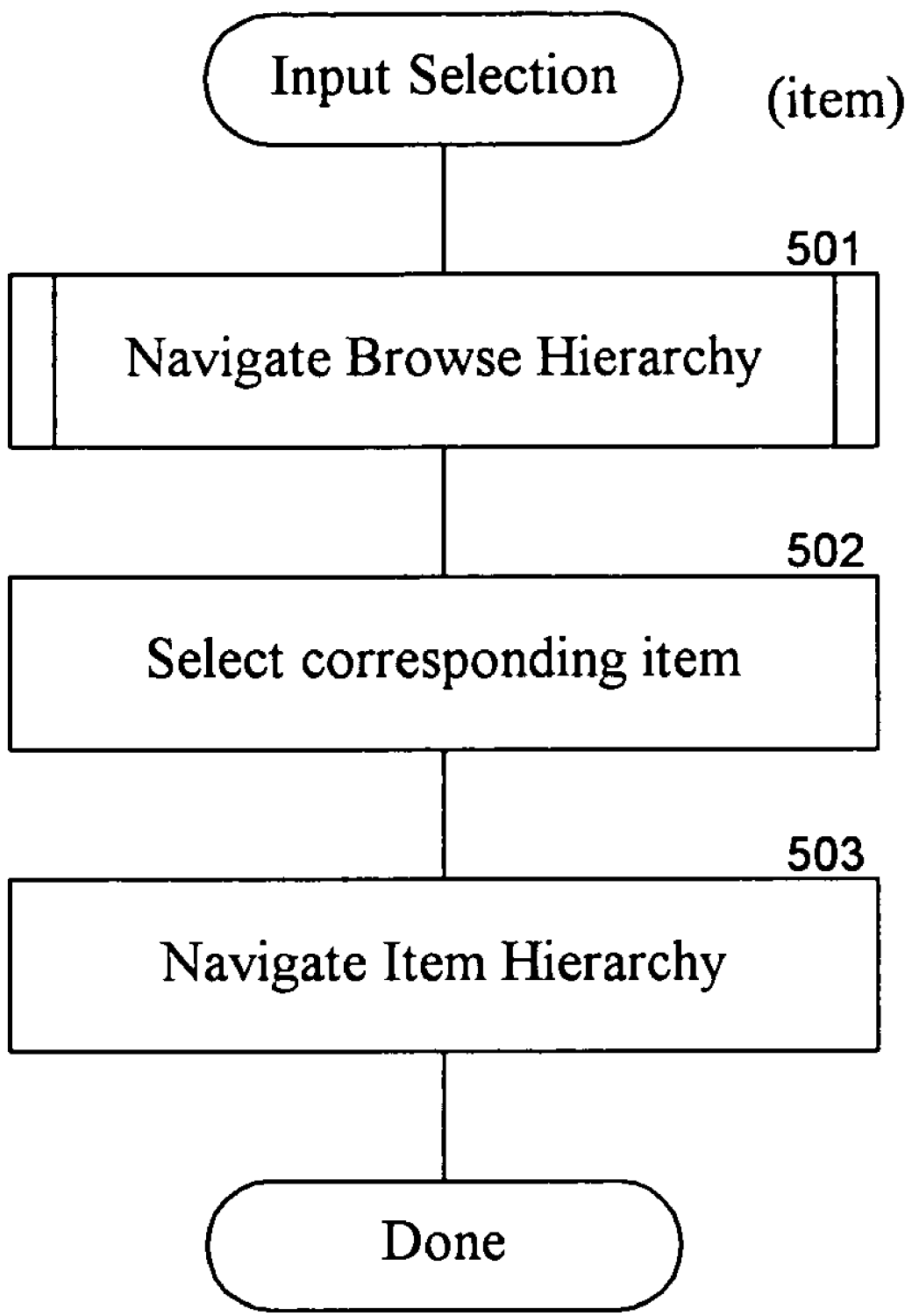
FIG. 5 is a flow diagram of an example implementation of the input selection function.

FIG. 5 is a flow diagram of an example implementation of the input selection function. The input selection function allows a user to navigate the browse category hierarchy and select a browse category. The function may then allow the user to navigate the item classification hierarchy starting from the item classification corresponding to the selected browse category. The function returns the item classification. In step 501, the function allows the user to navigate the browse category hierarchy and to select a browse category by invoking the navigate browse category hierarchy function. In step 502, the function selects the item classification that corresponds to the selected browse category. In step 503, the function allows the user to navigate the item classification hierarchy to select an item classification. The navigation of the item classification hierarchy is performed in a manner analogous to the navigation of the browse category hierarchy, which is described below. One skilled in the art will appreciate that while navigating the item classification hierarchy the user may select to navigate back up the browse category hierarchy.

Figure 6:
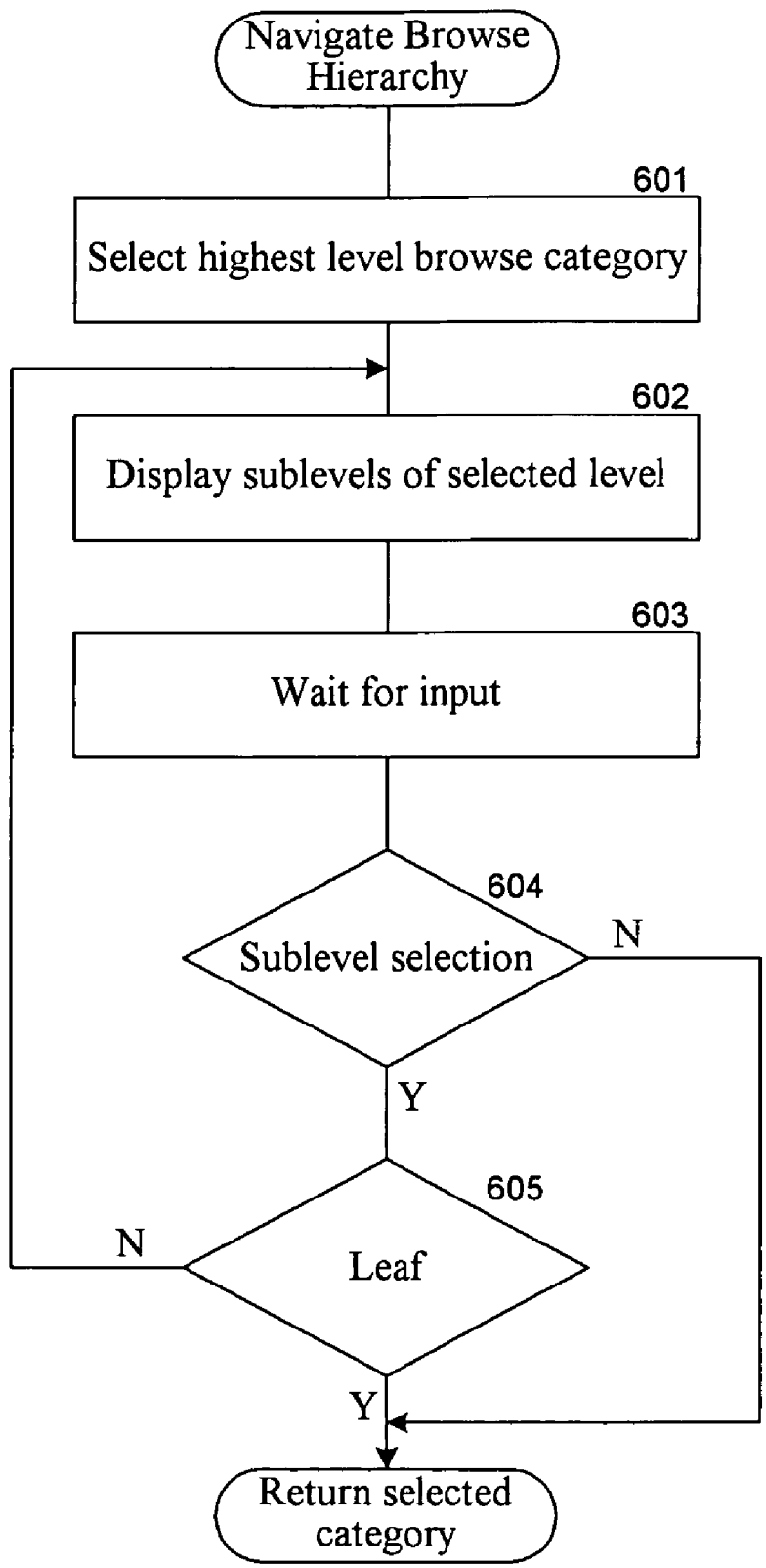
FIG. 6 is a flow diagram of an example implementation of a function to navigate the browse category hierarchy.

FIG. 6 is a flow diagram of an example implementation of a function to navigate the browse category hierarchy. In step 601, the function selects the highest level browse category. In step 602, the function displays the sub-categories of the selected browse category. In step 603, the function waits for user input. In step 604, if the user input is to select a sub-category, then the function continues at step 605, else the function returns the selected browse category. In step 605, if the selected browse category corresponds to a leaf category, then the function returns the selected browse category, else the function loops to step 601 to display the sub-categories of the selected category.

Figure 7:
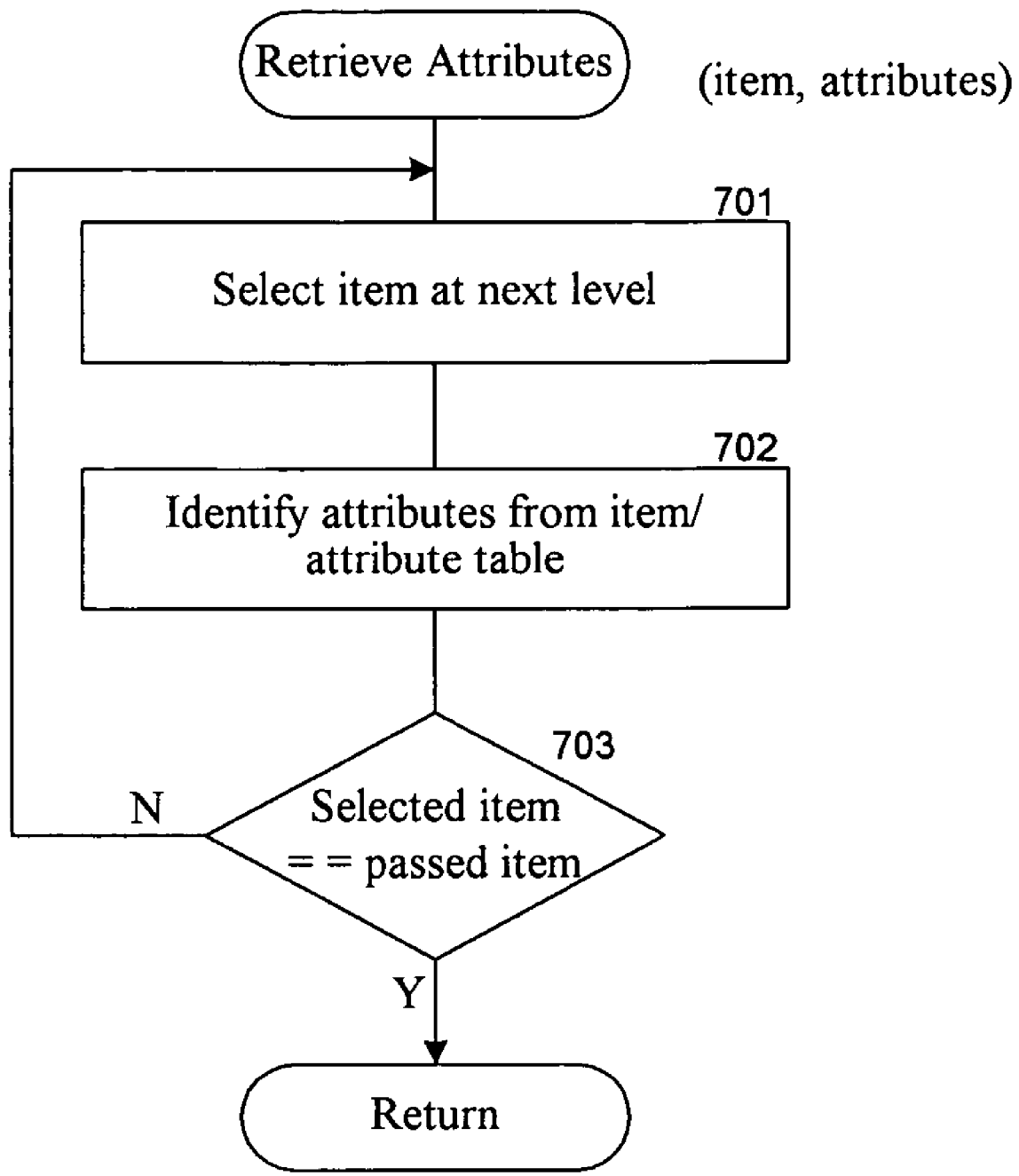
FIG. 7 is a flow diagram of an example implementation of a function that retrieves attributes for an item classification.

FIG. 7 is a flow diagram of an example implementation of a function that retrieves attributes for an item classification. This function is passed an item classification and returns the associated item-specific attributes. The attributes returned include the attributes for that item classification and any attributes inherited from higher-level item classifications. Inheritance and multiple inheritance of attribute values are described in Snyder, A., "Encapsulation and Inheritance in Object-Oriented Programming Languages," *Object-Oriented Fundamentals*, Association for Computing Machinery (1986), which is hereby incorporated by reference. In step 701, the function selects the next lowest level item classification starting with the highest level item classification. In step 702, the function identifies the attributes of the selected item classification from the item/attribute table. In step 703, if the selected item classification is the same as the passed item classification, then the function returns with all the identified attributes, else the function loops to step 701 to select the next lower level item classification.

FIGS. 8-13 illustrate the operation of the price analysis component of the price suggestion system. FIG. 8 illustrates a transaction table of the transaction database. The transaction table 800 corresponds to the "Barbie" item classification. This transaction table stores a description of each transaction for any type of Barbie doll. That is, in this example, the transaction database does not have a separate table for each sub-classification of the "Barbie" classification. Thus, the transaction table includes a model field to identify the model sub-classification is within the Barbie classification. The transaction table also contains the field for each attribute associated with the model classification. For example, the attributes may include condition, color, sale type, sale price, sale date, duration, year, and so on.

FIG. 9 illustrates an example display for generating a transaction price suggestion. In this example, the user has browsed to the "Barbie" browse category, which corresponds to the "Barbie" item classification. In response, the price analysis component retrieved the attributes associated with the Barbie item classification. The price analysis component then displayed the attribute specification grid 901. The first row of the attribute specification grid contains the name of the attributes. The second row of the attribute specification grid is for the user to specify the attribute values. In this example, the user specified that the model number is "123," the condition is "good," that the color is "red," the sale type is "auction," and that the duration is "<3." Thus, the user has specified that a price should be suggested for a model 123 Barbie doll, that is in a good condition, that is red, and that is the subject of an auction that will last less than 3 days. After the user inputs the attribute values, the user selects the suggest price button 902. If the user had browsed down to the "123" classification, then the attribute specification grid would not have included the model attribute.

FIG. 10 illustrates an example display of suggested price information. This display lists the browse category hierarchy 1000 and the attribute specification grid 1001. The display also includes a suggested price field 1002 and a statistics table 1003. In this example, the price suggestion system suggested that a sale price of between $75 and $100 would be needed to sell the Barbie doll in less than three days. The suggested price could in general be interpreted to be a fair market value which can be used when listing an item to be auctioned, when bidding on an item at an auction, or when purchasing an item at a fixed price. In this example, the statistics table includes a minimum, average, median, and maximum price. The statistics table may also include other information such as the mean, mode, and standard deviation. The display also includes various buttons 1004 by which the user can review the details of the underlying transactions, list an item matching these attributes for sale at a fixed price or at an auction, and place a bid on an item matching these attributes.

Figure 11:
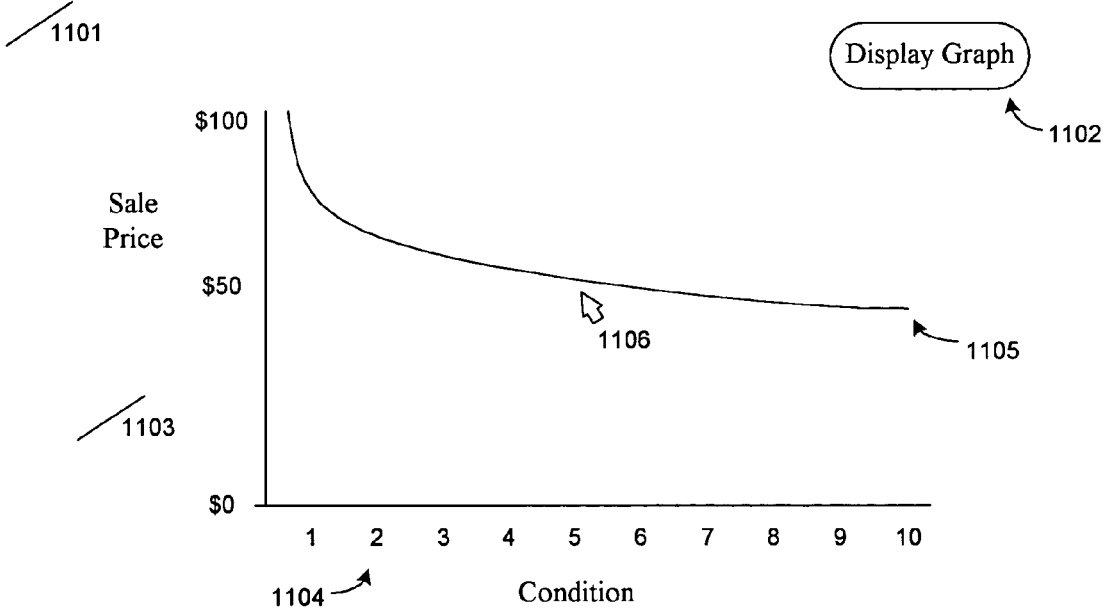
FIG. 11 illustrates an example display of transaction trend analysis information.

FIG. 11 illustrates an example display of transaction trend analysis information. A transaction trend analysis provides a graph that illustrates the trend in transactions based on selected item classification and attribute values. In this example, the price analysis component displays a graph with x and y coordinates as specified by the user. The price analysis component displays the attribute specification grid 1101. The user then enters the attribute values in the second row of the attribute specification grid. In this example, the user selected to graph the condition of the item versus the sale price of the item as indicated by the "X" and "Y" in the condition field and the sale price field. The user also indicated to restrict the trend analysis to review of auction transactions with the duration of less than 3 days and with a sale date later than Jan. 1, 1999. After the user filled in the second row of the attribute specification grid, the user selected the display graph button 1102. In response to the selection of the display graph button, the price analysis component retrieved the transactions that matched the attribute specification and displayed a graph of the sales price versus condition. In this example, the price analysis component performed a curve fitting analysis to generate a smooth curve. One skilled in the art would appreciate that a graph may also be represented as scattered data where each transaction is represented by a point on the graph. In one embodiment, when a user selects the point on the graph using a pointing device, such as a mouse and a cursor 1106, the price analysis component displays the underlying transaction data relating to that point. For example, the transaction data may be displayed in tabular format that is similar to that of FIG. 8.

Figure 12:
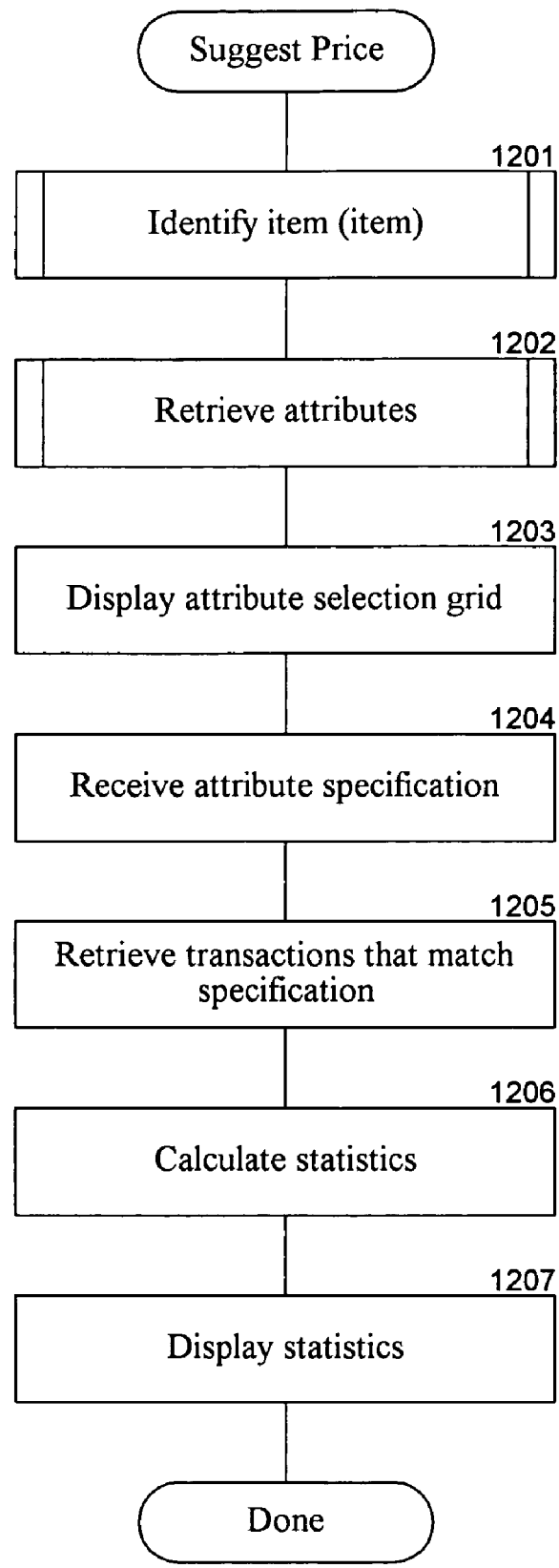
FIG. 12 is a flow diagram of an example implementation of a suggest price function.

FIG. 12 is a flow diagram of an example implementation of a suggest price function. The suggest price function identifies an item classification, receives an attribute specification for that item classification, and then suggests a price based on the item classification and attribute specification. In step 1201, the function invokes the identify item function to identify an item classification. In step 1202, the function invokes the retrieve attributes function to retrieve the attributes associated with the identified item classification. In step 1203, the function displays an attribute specification grid based on the retrieved attributes. In step 1204, the function receives an attribute specification from the user. In step 1205, the function retrieves the transactions from the transaction database that match the attribute specification. In step 1206, the function calculates statistics based on the retrieved transactions, which may include a suggested price. In step 1207, the function displays the statistics and then completes.

Figure 13:
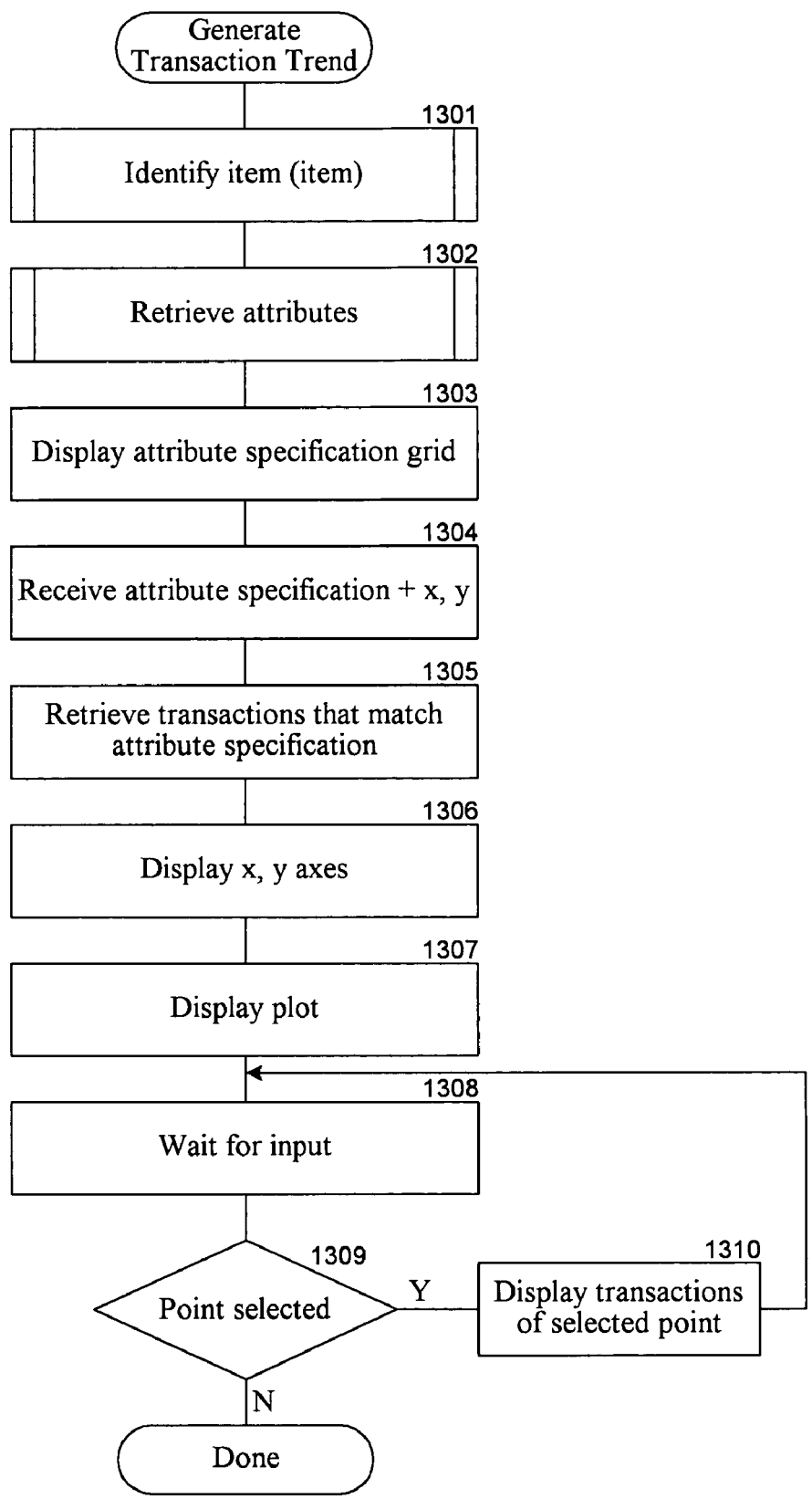
FIG. 13 is a flow diagram of an example implementation of a generate transaction trend function.

FIG. 13 is a flow diagram of an example implementation of a generate transaction trend function. This function identifies an item classification, receives an attribute specification for that item classification, and then displays a graph summarizing the transaction information. In step 1301, the function invokes the identify item function to identify an item classification. In step 1302, the function retrieves the attributes associated with the identified item classification by invoking the retrieve attributes function. In step 1303, the function displays an attribute specification grid based on the retrieved attributes. In step 1304, the function receives the attribute specification along with an "X" and "Y" coordinate specification from the user. In step 1305, the function retrieves the transactions that match the item classification and attribute specification. In step 1306, the function displays the axes for the graph. In step 1307, the function generates and displays the graph. In step 1308, the function waits for input from the user. In step 1309, if the input is to select a point on a graph, then the function continues in step 1310, else the function completes. In step 1310, the function displays the transactions associated with the selected point and then loops to step 1308 to wait for additional input.

Based upon the above description, it will be appreciated that, although specific embodiments of the invention have been described herein for purposes of illustration, various modifications may be made without deviating from the spirit and scope of the invention. For example, one skilled in the art will appreciate that many different analyses can be performed or transactions that have been specified using item specific attributes. Also, one skilled in the art would appreciate that item-specific attributes can be used independently of navigation technique for identifying classifications. In one embodiment, the item-specific attributes can be used when item classifications are identified using key word searching. Accordingly, the invention is not limited except as by the appended claims.

The invention claimed is:

1. A method, comprising the steps of:
providing, in at least one computing device, item classification data that associates each of a plurality of item classifications with a corresponding set of attributes from a plurality of sets of attributes;
obtaining, in the at least one computing device, a selection by a user of one of the item classifications from a client computing device;
generating, in the at least one computing device, a first user interface that includes a listing of the set of attributes corresponding to the one of the item classifications according to the selection, the first user interface being configured to obtain at least one input value for the set of attributes from the user;
sending, in the at least one computing device, data including the first user interface to the client computing device;
obtaining, in the at least one computing device, the at least one input value specified by the user for the set of attributes from the client computing device;
determining, in the at least one computing device, a suggested price range from a set of historical sales prices in an auction system for a plurality of items that are classified under the one of the item classifications and match the at least one input value for the set of attributes;
generating, in the at least one computing device, a second user interface including the suggested price range and a graph of the historical sale prices versus a corresponding value of one of the set of attributes for each respective one of the items; and
sending, in the at least one computing device, data including the second user interface to the client computing device.

2. The method of claim 1, wherein the second user interface is configured to obtain an input value specified by the user for a fixed price of an item to be listed in the auction system, and the method further comprises the steps of:
obtaining, in the at least one computing device, the input value specified by the user from the client computing device; and
configuring, in the at least one computing device, the auction system to include a listing for an item having the input value as the fixed price, the item being classified under the one of the item classifications and having the at least one input value for the set of attributes.

3. The method of claim 1, wherein the second user interface is configured to obtain an input value specified by the user for a starting price of an item to be listed in the auction system, and the method further comprises the steps of:
obtaining, in the at least one computing device, the input value specified by the user from the client computing device; and
configuring, in the at least one computing device, the auction system to include a listing for an item having the input value as the starting price, the item being classified under the one of the item classifications and having the at least one input value for the set of attributes.

4. The method of claim 1, wherein the second user interface is configured to obtain an input value specified by the user for a bid on an item that is listed in the auction system, and the method further comprises the steps of:
obtaining, in the at least one computing device, the input value specified by the user from the client computing device; and
placing, in the at least one computing device, a bid corresponding to the input value for the item in the auction system, the item being classified under the one of the item classifications and having the at least one input value for the set of attributes.

5. The method of claim 1, wherein the suggested price range includes a suggested maximum price and a suggested minimum price.

6. The method of claim 1, wherein the second user interface includes an interface for listing an item for sale in the auction system, the item being classified under the one of the item classifications, the item having the at least one input value for the set of attributes.

7. The method of claim 1, further comprising the step of determining, in the at least one computing device, the suggested price range based at least in part on whether the suggested price range is to correspond to a suggested fixed price listing in the auction system.

8. The method of claim 1, further comprising the step of determining, in the at least one computing device, the suggested price range based at least in part on whether the suggested price range is to correspond to a suggested bid price for an existing item that is listed in the auction system.

9. The method of claim 1, further comprising the steps of:
obtaining, in the at least one computing device, a desired auction length specified by the user from the client computing device; and
determining, in the at least one computing device, the suggested price range based at least in part on the desired auction length.

10. The method of claim 1, further comprising the steps of:
generating, in the at least one computing device, a third user interface that is configured to facilitate the selection by the user of the one of the item classifications based at least in part on a subset of the item classifications that match at least one keyword specified by the user; and
sending, in the at least one computing device, data including the third user interface to the client computing device.

11. The method of claim 1, further comprising the steps of:
generating, in the at least one computing device, a third user interface that is configured to facilitate the selection by the user of the one of the item classifications from a hierarchy of the item classifications; and
sending, in the at least one computing device, data including the third user interface to the client computing device.

12. The method of claim 11, wherein the hierarchy corresponds to one of a plurality of hierarchies of the item classifications.

13. A system, comprising:
at least one computing device;
a storage device storing item classification data, accessible to the at least one computing device, that associates each of a plurality of item classifications with a corresponding set of attributes from a plurality of sets of attributes; and
a price suggestion application executable in the at least one computing device, the price suggestion application comprising:
logic that encodes a first user interface for rendering by a client computing device, the first user interface including a listing of the set of attributes corresponding to one of the item classifications according to a selection by a user of the one of the item classifications, the first user interface being configured to obtain at least one input value for the set of attributes from the user;
logic that obtains the at least one input value specified by the user for the set of attributes from the client computing device; and
logic that encodes a second user interface for rendering by the client computing device, the second user interface including a suggested price range that is determined from a set of historical sales prices in an auction system for a plurality of items that are classified under the one of the item classifications and match the at least one input value for the set of attributes, the second user interface further including a graph of the historical sale prices versus a corresponding value of one of the set of attributes for each respective one of the items.

14. The system of claim 13, wherein the second user interface is configured to obtain an input value specified by the user for a fixed price of an item to be listed in the auction system, and the price suggestion application further comprises:
logic that obtains the input value specified by the user from the client computing device; and
logic that configures the auction system to include a listing for an item having the input value as the fixed price, the item being classified under the one of the item classifications and having the at least one input value for the set of attributes.

15. The system of claim 13, wherein the second user interface is configured to obtain an input value specified by the user for a starting price of an item to be listed in the auction system, and the price suggestion application further comprises:
logic that obtains the input value specified by the user from the client computing device; and
logic that configures the auction system to include a listing for an item having the input value as the starting price, the item being classified under the one of the item classifications and having the at least one input value for the set of attributes.

16. The system of claim 13, wherein the second user interface is configured to obtain an input value specified by the user for a bid on an item that is listed in the auction system, and the price suggestion application further comprises:
logic that obtains the input value specified by the user from the client computing device; and
logic that places a bid corresponding to the input value for the item in the auction system, the item being classified under the one of the item classifications and having the at least one input value for the set of attributes.

17. The system of claim 13, wherein the second user interface includes an interface for listing an item for sale in the auction system, the item being classified under the one of the item classifications, the item having the at least one input value for the set of attributes.

18. The system of claim 13, wherein the price suggestion application further comprises logic that determines the suggested price range based at least in part on whether the suggested price range is to correspond to a suggested fixed price listing in the auction system.

19. The system of claim 13, wherein the price suggestion application further comprises logic that determines the suggested price range based at least in part on whether the suggested price range is to correspond to a suggested bid price for an existing item that is listed in the auction system.

20. The system of claim 13, wherein the price suggestion application further comprises:
logic that obtains a desired auction length specified by the user from the client computing device; and
logic that determines the suggested price range based at least in part on the desired auction length.

21. A non-transitory computer-readable medium embodying a program executable in a computing device, the program comprising:
code that obtains a selection of one of a plurality of item classifications from a user, each of the item classifications being associated with a respective set of attributes;
code that renders a first user interface for specifying at least one input value for a set of attributes associated with the one of the item classifications;
code that obtains the at least one input value from the user for the set of attributes; and
code that renders a second user interface that includes a suggested price range for an item in an auction system, the suggested price range being determined at least in part from a set of historical sales prices in the auction system for a plurality of items that are classified under the one of the item classifications and match the at least one input value for the set of attributes, the second user interface further including a graph of the historical sale prices versus a corresponding value of one of the set of attributes for each respective one of the items.

22. The non-transitory computer-readable medium of claim 21, wherein the program further comprises code that obtains data for rendering the first user interface and the second user interface from at least one computing device over a network.

23. The non-transitory computer-readable medium of claim 21, wherein the second user interface is configured to obtain an input value specified by the user for a fixed price of the item which is to be listed in the auction system, and the program further comprises:
   code that obtains the input value from the user;
   code that sends the input value to at least one computing device associated with the auction system; and
   wherein the auction system is configured to include a listing for an item having the input value as the fixed price, the item being classified under the one of the item classifications and having the at least one input value for the set of attributes.

24. The non-transitory computer-readable medium of claim 21, wherein the second user interface is configured to obtain an input value specified by the user for a starting price of the item which is to be listed in the auction system, and the program further comprises:
   code that obtains the input value from the user;
   code that sends the input value to at least one computing device associated with the auction system; and
   wherein the auction system is configured to include a listing for an item having the input value as the starting price, the item being classified under the one of the item classifications and having the at least one input value for the set of attributes.

25. The non-transitory computer-readable medium of claim 21, wherein the program further comprises code that renders a third user interface that is configured to facilitate the selection by the user of the one of the item classifications based at least in part on a subset of the item classifications that match at least one keyword specified by the user.

* * * * *